(12) United States Patent
Ichiryu

(10) Patent No.: US 8,037,768 B2
(45) Date of Patent: Oct. 18, 2011

(54) VIBROMETER MOUNTING MECHANISM

(75) Inventor: Taku Ichiryu, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 370 days.

(21) Appl. No.: 12/232,181

(22) Filed: Sep. 11, 2008

(65) Prior Publication Data

US 2009/0071256 A1    Mar. 19, 2009

(30) Foreign Application Priority Data

Nov. 1, 2006    (JP) ................................. 2006-297924

(51) Int. Cl.
  *G01M 13/04*    (2006.01)
(52) U.S. Cl. ............................................ 73/660; 73/662
(58) Field of Classification Search ................ 73/660, 73/662, 663, 666
  See application file for complete search history.

(56) References Cited

U.S. PATENT DOCUMENTS

| | | | | |
|---|---|---|---|---|
| 3,271,531 | A | * | 9/1966 | Winogrocki et al. ......... 200/6 B |
| 3,553,726 | A | * | 1/1971 | Zimmerman ................... 310/15 |
| 4,279,159 | A | * | 7/1981 | Powell et al. ................... 73/651 |
| 4,292,133 | A | * | 9/1981 | Sasaki et al. .................. 376/260 |
| 4,454,769 | A | * | 6/1984 | Loos ......................... 73/862.041 |
| 4,639,025 | A | * | 1/1987 | Fann et al. ..................... 292/337 |
| 6,227,061 | B1 | * | 5/2001 | Thermos ....................... 73/866.5 |
| 6,257,543 | B1 | * | 7/2001 | Huelsmann .................... 248/674 |
| 6,290,573 | B1 | * | 9/2001 | Suzuki .............................. 451/8 |
| 2009/0064520 | A1 | * | 3/2009 | Sherlock et al. ................ 33/562 |

FOREIGN PATENT DOCUMENTS

| | | |
|---|---|---|
| JP | 50-15049 | 5/1975 |
| JP | 57-001925 A | 1/1982 |
| JP | 58-008824 A | 1/1983 |
| JP | 58-8824 A | 1/1983 |
| JP | 60-314 A | 1/1985 |
| JP | 60-190605 A | 9/1985 |
| JP | 2002-235506 A | 8/2002 |
| JP | 2008-115719 A | 5/2006 |
| JP | 51-000982 | 9/2008 |

OTHER PUBLICATIONS

Notice of Reasons for Rejection dated May 10, 2011, issued in corresponding Japanese Patent Application No. 2006-297924.

\* cited by examiner

*Primary Examiner* — Jacques M Saint Surin
(74) *Attorney, Agent, or Firm* — Westerman, Hattori, Daniels & Adrian, LLP

(57) ABSTRACT

Adjustment of the distance between the tip of a pickup section and the outer surface of a shaft of a rotor can be carried out easily and with high precision. In a vibrometer mounting mechanism securing a measuring section of a vibrometer for measuring vibration of a shaft of a rotary machine to a casing of the rotary machine, the vibrometer mounting mechanism includes a case secured to the casing with fixing means; an inner cylinder that accommodate the measuring section at one end, that is disposed in the inside of the case, and that slides relative to the case; and an adjustment bolt disposed at one end of the case and capable of moving forward and backward with respect to the case and the inner cylinder, wherein the inner cylinder is made to move in a direction away from the shaft by the adjustment bolt being inserted into the case and the inner cylinder, and wherein the inner cylinder is made to move in a direction toward the shaft by the adjustment bolt being retracted from the case and the inner cylinder.

14 Claims, 3 Drawing Sheets

VIBROMETER MOUNTING MECHANISM

BACKGROUND OF THE INVENTION

1. Field of the Invention

The present invention relates to a vibrometer mounting mechanism for securing, in the casing, a vibrometer for measuring, for example, the vibration of a shaft of a rotor of a gas turbine.

This application is based on Japanese Unexamined Patent Application, Publication No. 2008-115719, the content of which is incorporated herein by reference.

2. Description of Related Art

In the past, a gap adjusting apparatus, disclosed in, for example, Japanese Unexamined Patent Application, Publication No. SHO-58-8824, could be used to adjust the distance (gap) between the tip of a pickup section (measuring section) of a vibrometer and the outer surface of the shaft of a rotor.

A known vibrometer mounting mechanism adjusts the distance between the tip of a pickup section and the outer surface of a shaft of the rotor to a predetermined distance by rotating the pickup section and then secures the pickup section in the casing with a locknut.

However, with this gap adjusting apparatus and vibrometer mounting mechanism, the member (for example, locknut) securing the pickup section to the casing is disposed at the pickup section and near the shaft, i.e., locations that are difficult for an operator to reach and work on (a location with poor accessibility). Therefore, there are problems in that the pickup section cannot be easily secured at a predetermined location with good precision because the adjustment work of the distance between the tip of the pickup section and the outer surface of the shaft cannot be carried out easily, and, when tightening a member for securing the pickup section in the casing, the pickup section might rotate together with that member.

BRIEF SUMMARY OF THE INVENTION

The present invention has been conceived in light of the problems described above, and it is an object of the present invention to provide a vibrometer mounting mechanism that enables easy and highly precise adjustment of the distance between the tip of a pickup section and the outer surface of a shaft of the rotor.

The present invention provides the following solutions to solve the problems described above.

A vibrometer mounting mechanism according to the present invention is a vibrometer mounting mechanism a for securing a measuring section of a vibrometer for measuring vibration of a shaft of a rotary machine to a casing of the rotary machine, the vibrometer mounting mechanism including a case secured to the casing with securing means; an inner cylinder that accommodates the measuring section at one end, that is disposed inside the case, and that slides relative to the case; and an adjustment bolt disposed at one end of the case and capable of moving forward and backward with respect to the case and the inner cylinder, wherein the inner cylinder is made to move in a direction away from or toward the shaft by the adjustment bolt being inserted into the case and the inner cylinder, and wherein the inner cylinder is made to move in a direction toward or away from the shaft by the adjustment bolt being retracted from the case and the inner cylinder.

In such a vibrometer mounting mechanism, for example, as the bolt head of the adjustment bolt is turned with a wrench etc. in a direction to tighten the adjustment bolt, the entire adjustment bolt moves toward the case and the inner cylinder, and the inner cylinder moves to the opposite to (moves away from) the shaft.

On the other hand, as the bolt head of the adjustment bolt is turned using a wrench etc. in a direction to loosen the adjustment bolt, the entire adjustment bolt moves away from the case and the inner cylinder, and the inner cylinder moves toward (moves close to) the shaft.

In other words, by merely turning the adjustment bolt, the distance (gap) between the tip of the measuring section and the outer surface of the shaft can be easily adjusted.

Furthermore, the adjustment bolt can be disposed at a location or in a direction away from the measuring section and the shaft at a location where the adjustment work can be easily carried out (a location with good accessibility).

In this way, the adjustment of the distance between the tip of the measuring section and the outer surface of the shaft can be easily carried out with good precision, and the design aspects associated with the vibrometer attachment (mounting) position can be simplified (made easy).

As the bolt head of the adjustment bolt is turned using a wrench etc. in a direction to tighten the adjustment bolt, the entire adjustment bolt may move toward the case and the inner cylinder, and the inner cylinder may move toward (move close to) the shaft, and as the bolt head of the adjustment bolt is turned using a wrench etc. in a direction to loosen the adjustment bolt, the entire adjustment bolt may move away from the case and the inner cylinder, and the inner cylinder may move to the opposite side of (move away from) the shaft.

With the above-described vibrometer mounting mechanism, it is even more preferable that a pyramid section that has a polygonal shape in front view and that is tapered toward the tip be formed at one end of the adjustment bolt, and a bolt hole that receives the pyramid section in a freely rotatable manner and that has an inner circumferential surface be in contact with a side surface of the pyramid section.

With such a vibrometer mounting mechanism, when the pyramid section has, for example, a square shape in front view, each time the adjustment bolt moves by ¼ pitch of the thread, the side surface of the pyramid section that contacts the inner circumferential surface of the bolt hole is interchanged with a side surface adjacent to that side surface. In other words, the inner cylinder moves, in small steps, toward the side opposite to the shaft along the inclination angle of the side surface of the pyramid section.

On the other hand, each time the adjustment bolt moves by ¼ pitch of the thread, the side surface of the pyramid section that contacts the inner circumferential surface of the bolt hole is interchanged with a side surface adjacent to that side surface. In other words, the inner cylinder moves, in small steps, toward the shaft along the inclination angle of the side surface of the pyramid section.

The inner cylinder is placed on the side surface of the pyramid section at the inner circumferential surface of the bolt hole, and, consequently, rotation of the adjustment bolt is prevented, except for when the adjustment work is carried out.

The amount of movement of the inner cylinder is L×tan α, where L represents the distance the adjustment bolt moves at a ¼ pitch of the thread, and α represents the inclination angle of a side surface of the pyramid section.

With such a vibrometer mounting mechanism, it is even more preferable that a first urging member urging the inner cylinder toward the side of the shaft be provided between the end of the inner cylinder and the case.

With such a vibrometer mounting mechanism, since side walls of the pyramid section and the inner circumferential surface of the bolt hole are constantly held in contact with each other by the first urging member, the relative positions of the casing and the measuring section are prevented from changing due to vibration etc., and thus, accurate measurement can be carried out without the influence of vibrations etc.

With the above-described vibrometer mounting mechanism, it is even more preferable that a second urging member urging the adjustment bolt in a direction away from the case be provided between the adjustment bolt and the case.

With such a vibrometer mounting mechanism, since jolting of the adjustment bolt in the axial direction can be prevented by the second urging member, the relative positions of the casing and the measuring section can be prevented from changing due to vibration, and thus, accurate measurement can be carried out without the influence of vibrations etc.

Since a rotary machine according to the present invention includes a vibrometer mounting mechanism capable of easily carrying out adjustment of the distance between the tip of the measuring section and the outer surface of the shaft of the rotor with good precision, the efficiency of installation of a new rotary machine and maintenance can be increased, and the number of working hours can be decreased.

The present invention is advantageous in that the adjustment of the distance between the tip of a pickup section and the outer surface of a shaft of a rotor can be easily carried out with good precision.

DETAILED DESCRIPTION OF THE INVENTION

An embodiment of a vibrometer mounting mechanism according to the present invention will be described below with reference to FIGS. 1 to 3.

Figure 1:
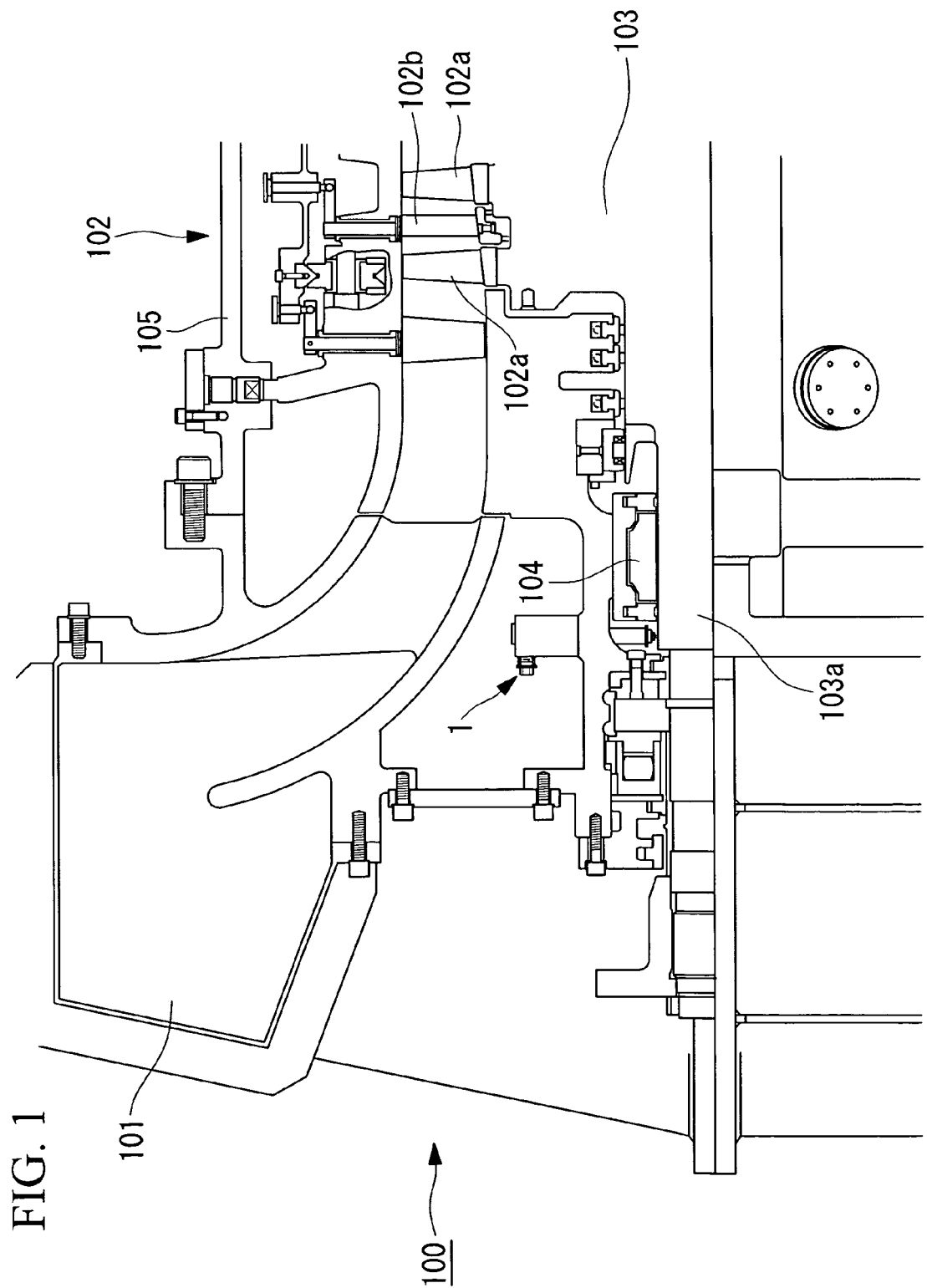
FIG. 1 is a partial schematic diagram of a gas turbine in which a vibrometer mounting mechanism according to an embodiment of the present invention is employed.
Figure 2A:
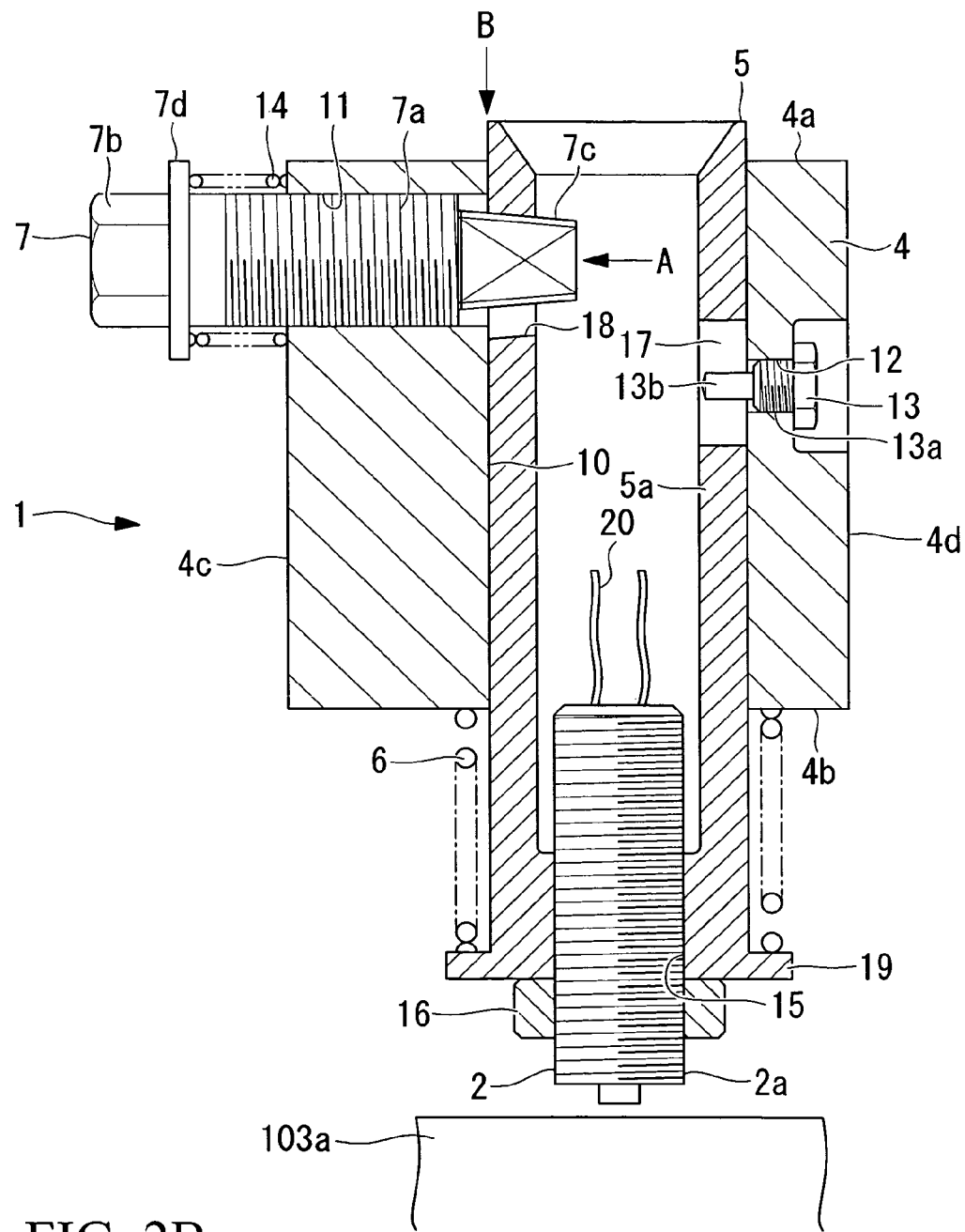
FIG. 2A is a sectional view illustrating the vibrometer mounting mechanism according to an embodiment of the present invention.
Figure 2B:
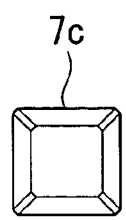
FIG. 2B is a front view taken along arrow A in FIG. 2A.

FIG. 1 is a partial schematic diagram of a turbine (hereinafter referred to as "gas turbine") 100 in which a vibrometer mounting mechanism 1 according to this embodiment is employed; FIG. 2A is a sectional view illustrating the vibrometer mounting mechanism 1 according to this embodiment; FIG. 2B is a front view taken along arrow A in FIG. 2A; and FIG. 3 is a plan view taken along arrow B in FIG. 2B.

As shown in FIG. 1, the gas turbine (rotary machine) 100 is mainly constructed of a compressor 102 for compressing air taken in through an intake manifold 101, a combustor (not shown) for generating combustion gas by receiving air compressed at the compressor 102 and fuel, and a turbine (not shown) rotated by the combustion gas generated at the combustor.

The gas turbine 100 includes a rotor 103 having rotor blades 102a protruding radially on the outer circumference, a journal bearing 104 for supporting the rotor 103 by a bearing, and a casing (casing) 105 in which stator blades 102b are vertically disposed on the inner circumference.

The vibrometer mounting mechanism 1 according to this embodiment secures (attaches), in the casing 105, a pickup section (measurement unit) 2 (see FIGS. 2A and 3) of a vibrometer (distance sensor) that is disposed near the journal bearing 104 and that constantly measures the shaft vibration of a shaft 103a of the rotor 103.

As shown in FIG. 2A, the vibrometer mounting mechanism 1 is mainly constructed of a case 4 secured (attached) to the casing 105 (see FIG. 1) with attachment bolts (securing means) 3 (see FIG. 3), an inner cylinder 5 disposed on the inner side of the case 4, a spring (first urging member) 6 disposed between the case 4 and the inner cylinder 5, and an adjustment bolt 7 for adjusting the relative positions of the case 4 and the inner cylinder 5.

Figure 3:
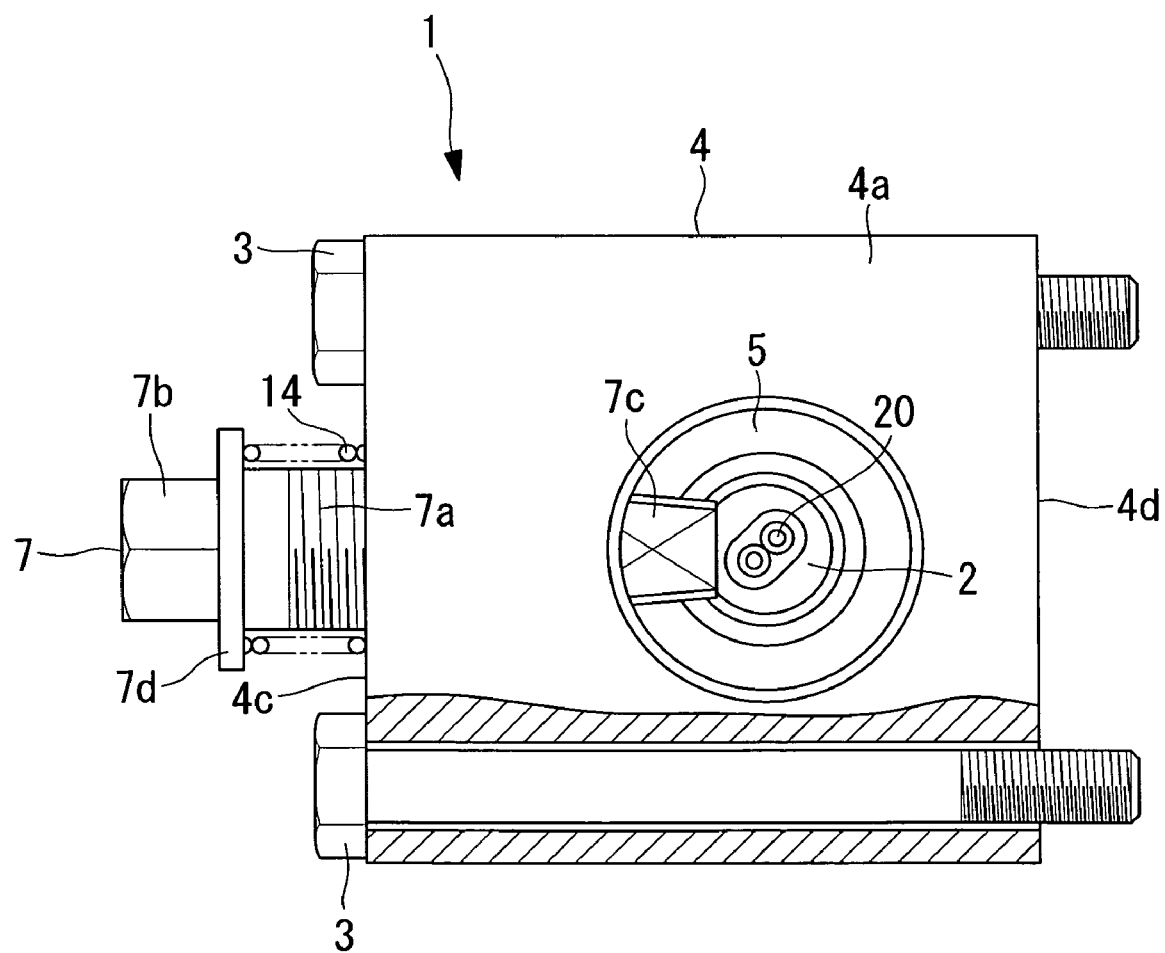
FIG. 3 is a plan view taken along arrow B in FIG. 2A.

As shown in FIGS. 2A and 3, the case 4 is a box-shaped member that externally appears as a substantially cubic shape (a substantially rectangular solid). At substantially the center of the case 4 in plan view, a first through-hole 10 is formed to connect a front surface 4a and a back surface 4b of the case 4 in the height direction (a direction orthogonal to the rotary axis of the shaft 103a and the up-and-down direction in FIG. 2A). At one end of the case 4 in a front view, a second through-hole 11 is formed to connect a side surface 4c of the case 4 and the first through-hole 10 in the width direction (a direction parallel to the rotary axis of the shaft 103a and the left-to-right direction in FIG. 2A).

Furthermore, at substantially the center of the case 4 in a back view, a third through-hole 12 is formed to connect another side surface of the case 4 (the side surface opposite to the side surface 4c) 4d and the first through-hole 10 in the width direction (a direction parallel to the rotary axis of the shaft 103a and the left-to-right direction in FIG. 2A).

The cross-sections of the first through-hole 10, the second through-hole 11, and the third through-hole 12 are circular. The first through-hole 10 is formed such that its inner diameter is substantially the same as the outer diameter of the inner cylinder 5; the second through-hole 11 is formed such that its inner diameter is substantially the same as the outer diameter of the adjustment bolt 7; and the third through-hole 12 is formed such that its inner diameter is substantially the same as the outer diameter of a rotation-prevention pin 13. The inner circumferential surface of the first through-hole 10 is a smooth surface; a thread (not shown) that engages with a thread 7a provided on the outer circumferential surface of the shaft of the adjustment bolt 7 is provided on the inner circumferential surface of the second through-hole 11; and a thread (not shown) that engages with a thread 13a provided on the outer circumferential surface of the shaft of the rotation-prevention pin 13 is provided on the inner circumferential surface of the third through-hole 12. The rotation-prevention pin 13 is a member for preventing rotation of the inner cylinder 5 relative to the case 4.

The adjustment bolt 7 has a bolt head 7b on one of its ends and has a pyramid section 7c on the other end; and a shaft having the thread 7a on the outer circumferential surface is provided between the bolt head 7b and the pyramid section 7c. A flange section 7d is provided between the adjustment bolt 7 and the shaft; and a spring (second urging member) 14 is disposed between the back side (the surface opposite to the side surface 4c of the case 4) of the flange section 7d and the side surface 4c of the case 4. The spring 14 is a member for urging the adjustment bolt 7 away from (separating from) the side surface 4c of the case 4. As shown in FIG. 2B, the pyramid section 7c is a member that has a polygonal shape (square in this embodiment) in front view (sectional view) and is tapered toward the tip (side opposite to the bolt head 7b). In other words, each side surface of the pyramid section 7c (four side surfaces in this embodiment) is a flat surface inclined such that the side surfaces become closer to each other from the shaft side to the tip.

The inner cylinder 5 is a hollow member having an attachment hole 15 for attaching the pickup section 2 to one of the ends and being open at the other end. The attachment hole 15 is formed with an inner diameter is substantially the same as the outer diameter of the pickup section 2; and a thread (not shown) that engages with a thread 2a provided on the outer circumferential surface of the pickup section 2 is provided on the inner circumferential surface of the attachment hole 15. Furthermore, the pickup section 2, which is attached at a predetermined position in the attachment hole 15, is secured to the inner cylinder 5 with a locknut 16.

The wall of the outer circumferential surface of the inner cylinder 5 is a smooth surface; and a pin hole 17 in which a pin section 13b provided at the tip section of the rotation-prevention pin 13 is inserted and a bolt hole 18 in which the pyramid section 7c of the adjustment bolt 7 is inserted are formed in the wall 5a of the inner cylinder 5.

The pin hole 17 is an elongated hole that extends in the length direction of the inner cylinder 5 and has a rectangular shape in front view (plan view), formed such that the width substantially aligns with the outer diameter of the pin section 13b. The inner circumferential surface of the pin hole 17 is a smooth surface.

The bolt hole 18 is provided on a wall 5a opposite to the wall 5a where the pin hole 17 is formed (i.e., the wall 5a opposing the pin hole 17), extends in the length direction of the inner cylinder 5, and is a elongated hole formed as a rectangular shape in front view (plan view) and larger than the outer diameter of the pyramid section 7c of the adjustment bolt 7 (in order that the pyramid section 7c is capable of rotate in the bolt hole 18); one surface (the surface opposite to the side on which the pickup section 2 is located) on the inner circumferential surface of the bolt hole 18 is a flat surface having an inclination angle substantially the same as the inclination angle of the side surface of the pyramid section 7c.

A spring 6 is disposed between the back surface 4b of the case 4 and the back surface (the surface opposing the back surface 4b of the case 4) of a flange 19 provided at one end of the inner cylinder 5 and is a member for urging the inner cylinder 5 toward the shaft 103a.

Reference numeral 20 in FIGS. 2A and 3 represents wires for transmitting data (electrical signals) measured at the pickup section 2 to the main body (or control unit) of the vibrometer. Next, the process of adjusting the distance (gap) between the tip of the pickup section 2 and the outer surface of the shaft 103a will be described.

First, as the bolt head 7b is turned with a wrench etc. in a direction to tighten the adjustment bolt 7, the entire adjustment bolt 7 moves toward the back surface 4d of the case 4. At this time, each time the adjustment bolt 7 moves by ¼ pitch of the thread 7a, the side surface of the pyramid section 7c that contacts the inner circumferential surface of the bolt hole 18 is interchanged with a side surface adjacent to that side surface. In other words, the inner cylinder 5 moves, in small steps, toward the side opposite to the shaft 103a along the inclination angle of the side surface of the pyramid section 7c.

On the other hand, as the bolt head 7b is turned using a wrench etc. in a direction to loosen the adjustment bolt 7, the entire adjustment bolt 7 moves away from the back surface 4d of the case 4. At this time, each time the adjustment bolt 7 moves by ¼ pitch of the thread 7a, the side surface of the pyramid section 7c that contacts the inner circumferential surface of the bolt hole 18 is interchanged with a side surface adjacent to that side surface. In other words, the inner cylinder 5 moves, in small steps, toward the shaft 103a along the inclination angle of the side surface of the pyramid section 7c.

Then, the inner cylinder 5 is placed on the side surface of the pyramid section 7c at the inner circumferential surface of the bolt hole 18. When the adjustment bolt 7 is to be rotated from this position, regardless of the direction, it has to move over the corner section of the pyramid section 7c once, and to do so, it has to move against the load of the spring 6, which is equivalent to the lifted height. Since such a state does not occur naturally, as a result, the adjustment bolt 7 is prevented from rotating, and rotation of the adjustment bolt 7 is prevented, except for when the adjustment work is carried out.

The amount of movement of the inner cylinder 5 is L×tan α, where L represents the distance the adjustment bolt 7 moves at a ¼ pitch of the thread 7a, and α represents the inclination angle of the side surfaces of the pyramid section 7c. Therefore, even finer adjustment of the inner cylinder 5 is possible by decreasing the pitch of the thread 7a and reducing the inclination angle α. The amount of movement of the inner cylinder 5 can be reduced by setting the front view (sectional view) shape of the pyramid section 7c to a regular polygon with five or more sides. When the gap with respect to the shaft 103a is adjusted, the inner cylinder 5 is always lifted at the corner sections of the pyramid section 7c to increase the gap, allowing the gap to be adjusted freely.

With the vibrometer mounting mechanism 1 according to this embodiment, an adjustment member (adjustment bolt 7) for adjusting the distance (the gap) between the tip of the pickup section 2 and the outer surface of the shaft 103a can be disposed away from the pickup section 2 and the shaft 103a at a location where the adjustment work can be easily carried out (a location with good accessibility).

In this way, adjustment of the distance between the tip of the pickup section 2 and the outer surface of the shaft 103a can be carried out easily and with good precision, and the design aspect associated with the vibrometer attachment (mounting) position can be simplified (made easy).

Since the rotation prevention operation of the adjustment bolt 7 does not have to be carried out in a small area, the possibility of the adjustment bolt 7 becoming loose and causing the vibrometer to become inoperable can be eliminated.

With the vibrometer mounting mechanism 1 according to this embodiment, since jolting of the adjustment bolt 7 in the axial direction can be prevented by the spring 14 and since side walls of the pyramid section 7c and the inner circumferential surface of the bolt hole 18 are constantly held in contact with each other by the spring 6, the relative positions of the casing 105 and the pickup section 2 are prevented from changing due to vibration etc., and thus, accurate measurement can be carried out without the influence of vibrations etc.

What is claimed is:

1. A vibrometer mounting mechanism securing a measuring section of a vibrometer for measuring vibration of a shaft of a rotary machine to a casing of the rotary machine, the vibrometer mounting mechanism comprising:
    a case secured to the casing with securing means;
    an inner cylinder that accommodates the measuring section at one end, that is disposed inside the case, and that slides relative to the case; and
    an adjustment bolt disposed at one end of the case and capable of moving forward and backward with respect to the case and the inner cylinder,
    wherein the inner cylinder is made to move in a direction away from or toward the shaft by the adjustment bolt being inserted into the case and the inner cylinder, wherein the inner cylinder is made to move in a direction toward or away from the shaft by the adjustment bolt being retracted from the case and the inner cylinder;

wherein a pyramid section that has a polygonal shape in front view and that is tapered toward the tip is formed at one end of the adjustment bolt, and wherein a bolt hole that receives the pyramid section in a freely rotatable manner and that has an inner circumferential surface is in contact with a side surface of the pyramid section at the other end of the inner cylinder.

2. The vibrometer mounting mechanism according to claim 1, wherein a first urging member urging the inner cylinder toward the side of the shaft is provided between the end of the inner cylinder and the case.

3. The vibrometer mounting mechanism according to claim 1, wherein a second urging member urging the adjustment bolt in a direction away from the case is provided between the adjustment bolt and the case.

4. A rotary machine comprising:
a vibrometer mounting mechanism according to claim 1.

5. A vibrometer mounting mechanism securing a measuring section of a vibrometer for measuring vibration of a shaft of a rotary machine to a casing of the rotary machine, the vibrometer mounting mechanism comprising:
a case secured to the casing with securing means;
an inner cylinder that accommodates the measuring section at one end, that is disposed inside the case, and that slides relative to the case; and
an adjustment bolt disposed at one end of the case and capable of moving forward and backward with respect to the case and the inner cylinder,
wherein the inner cylinder is made to move in a direction away from or toward the shaft by the adjustment bolt being inserted or retracted into the case and the inner cylinder, and
wherein an axial direction of the inner cylinder is perpendicular to an axial direction of the shaft of the rotary machine.

6. The vibrometer mounting mechanism according to claim 5, wherein said adjustment screw is parallel to the shaft of the rotary machine.

7. The vibrometer mounting mechanism according to claim 5, further comprising an urging member which urges the inner cylinder either toward or away from the shaft of the rotary machine.

8. The vibrometer mounting mechanism according to claim 5, further comprising a second urging member which urges the inner cylinder either toward or away from the shaft of the rotary machine.

9. A rotary machine comprising:
a vibrometer mounting mechanism according to claim 5.

10. The vibrometer mounting mechanism according to claim 5, further comprising a rotation prevention pin which prevents the inner cylinder from rotating.

11. A vibrometer mounting mechanism securing a measuring section of a vibrometer for measuring vibration of a shaft of a rotary machine to a casing of the rotary machine, the vibrometer mounting mechanism comprising:
a case secured to the casing with securing means;
an inner cylinder that accommodates the measuring section at one end, that is disposed inside the case, and that slides relative to the case; and
an adjustment bolt disposed at one end of the case and capable of moving forward and backward with respect to the case and the inner cylinder,
wherein the inner cylinder is made to move in a direction away from or toward the shaft by the adjustment bolt being inserted or retracted into the case and the inner cylinder, and
wherein an axial direction of the adjustment bolt is perpendicular to an axial direction of the inner cylinder.

12. The vibrometer mounting mechanism according to claim 11, wherein said adjustment screw is parallel to the shaft of the rotary machine.

13. The vibrometer mounting mechanism according to claim 11, further comprising an urging member which urges the inner cylinder either toward or away from the shaft of the rotary machine.

14. The vibrometer mounting mechanism according to claim 11, further comprising a rotation prevention pin which prevents the inner cylinder from rotating.

\* \* \* \* \*